June 21, 1960
R. J. COAR
2,941,602
FUEL CONTROL FOR TURBOPROP ENGINE
Filed May 2, 1955
2 Sheets-Sheet 1
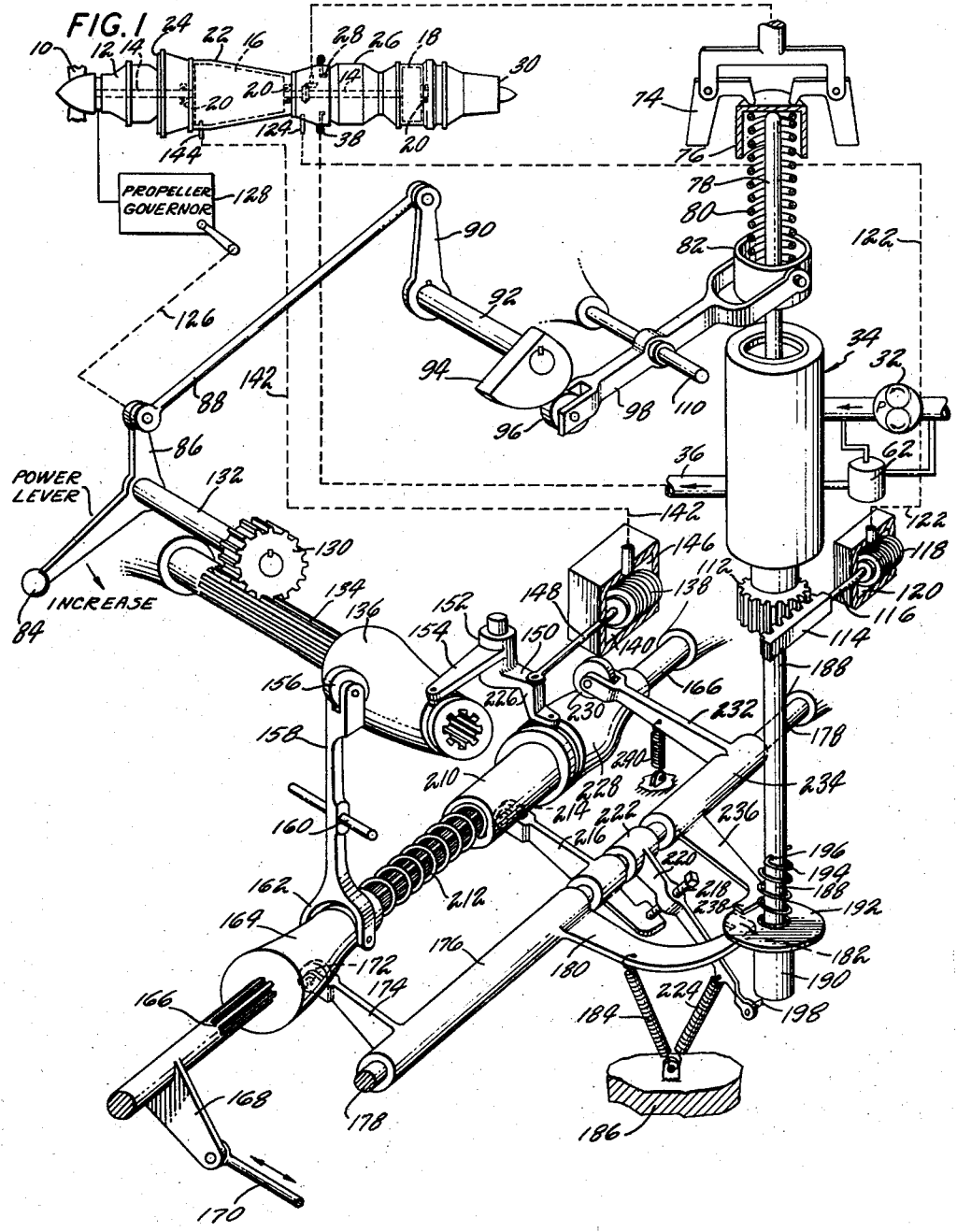
INVENTOR.
RICHARD J. COAR
BY
ATTORNEY June 21, 1960  R. J. COAR  2,941,602
FUEL CONTROL FOR TURBOPROP ENGINE
Filed May 2, 1955  2 Sheets-Sheet 2

INVENTOR
RICHARD J. COAR
BY
ATTORNEY

United States Patent Office 2,941,602
Patented June 21, 1960

2,941,602

FUEL CONTROL FOR TURBOPROP ENGINE

Richard J. Coar, West Hartford, Conn., assignor to United Aircraft Corporation, East Hartford, Conn., a corporation of Delaware Filed May 2, 1955, Ser. No. 505,149

13 Claims. (Cl. 170—135.74)

This invention relates to fuel controls for gas turbine power plants, more particularly to an improved fuel control for a turboprop aircraft engine.

Fuel controls for gas turbine power plants operate on a basis of sensing mass airflow through the power plant and metering fuel to produce a turbine operating temperature sufficient to satisfy the selected power requirement. Mass airflow is not measured directly, but since it is a function of inlet air temperature, power plant speed, and compressor discharge pressure the combined sensing of these variables is used as a parameter to which fuel flow is metered such that the desired turbine inlet temperature is maintained under all operating conditions.

An object of the invention, therefore, is to provide a fuel control for a turboprop engine which meets fuel metering requirements without undue complexity.

Another object of the invention is to provide a fuel control for a turboprop engine which meters both the maximum and minimum quantity of fuel usable by the power plant without exceeding operating limits.

Another object of the invention is to provide a turboprop engine fuel metering control combined with a governor to effect ground handling.

Another object of the invention is to provide a deceleration limit for a gas turbine power plant fuel control.

Another object of the invention is to provide a topping fuel governor for a gas turbine power plant fuel control, the governor using the normal flyweights in the fuel control.

Still another object of the invention is to provide in a gas turbine power plant fuel control the structure for satisfactory low speed measurement.

Other objects and advantages will be apparent from the specification and claims and from the accompanying drawings which illustrate a preferred embodiment of the invention.

In the drawings:

Fig. 1 is a schematic view of a control according to this invention in combination with a turboprop engine.

Figure 4:
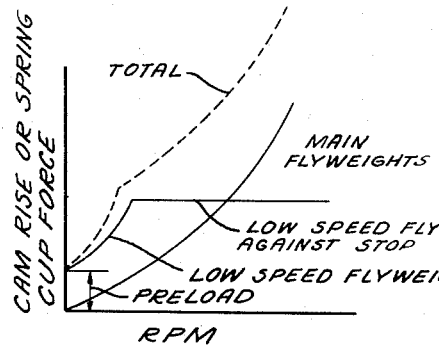
Fig. 4 is a graph showing the effect of the speed sensing device of Fig. 3.

Referring to the drawings in detail, the invention is shown in Fig. 1 in conjunction with a gas turbine power plant in which a part of the power is delivered through a variable pitch propeller. As shown, propeller 10 is driven through reduction gear 12 from shaft 14 which carries compressor rotor 16 and turbine rotor 18 thereon. The rotor is supported on bearings 20 carried by casing 22 within which compressor and turbine stators are positioned. Air entering inlet 24 is compressed as it passes through the compressor and is delivered to burner 26 where fuel is added through nozzles 28. The mixture of fuel and air is ignited within the burner and the products of combustion pass through the turbine to provide the energy to drive the propeller and compressor, and are then discharged through exhaust nozzle 30.

Figure 2:
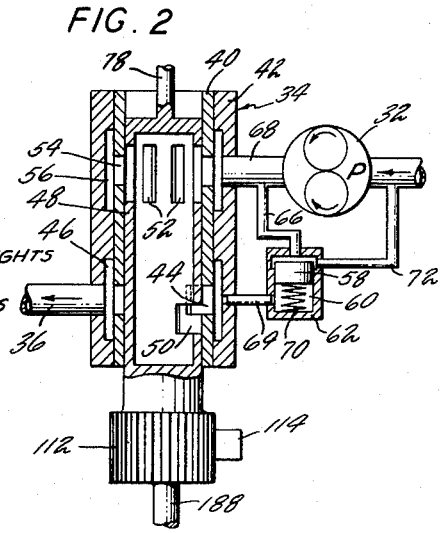
Fig. 2 is an enlarged sectional view through the fuel metering valve.

The purpose of the present control is to vary the rate of fuel delivery in accordance with power plant requirements as determined by certain operating variables of the power plant such as, for example, a compressor pressure, the temperature at a selected point within the power plant, the rotor speed and the selected power setting. As shown in Figs. 1 and 2, fuel is delivered by engine driven pump 32 to metering valve 34 and through conduit 36 to manifold 38 surrounding the power plant, from which the fuel reaches nozzles 28. Valve 34 is the only metering valve in the fuel line and all of the operating variables are so integrated as to control flow through this valve.

In the enlargement shown in Fig. 2, metering valve 34 has liner 40 fixed within casing 42, the liner having a rectangular port 44 communicating through annular groove 46 in the casing with outlet conduit 36. A movable sleeve 48 having rectangular port 50 fits within liner 40 and is both rotated and translated to adjust fuel flow to the power plant through port 44 and cooperating port 50, the main metering ports. Fuel enters sleeve 48 through longitudinally extending ports 52 therein and ports 54 in liner 40, both sets of ports being in alignment with annular groove 56 within casing 42. It is to be noted that the flow area through ports 52 and 54 is greater than the maximum flow area through metering ports 44 and 50.

For the purpose of making fuel flow solely a function of the effective area of metering ports 44 and 50, the pressure drop across the ports is maintained constant by a suitable device which may include piston 58 within chamber 60 in casing 62. Passage 64 connects annular groove 46 downstream of ports 44 and 50 with one end of chamber 60 to subject one side of piston 58 to metering valve outlet pressure, and passage 66 connects inlet conduit 68 upstream of the metering ports with the opposite end of the chamber to subject the other end of the piston to metering valve inlet pressure. Spring 70 assists the pressure from passage 64 acting on piston 58 to control the pressure drop across the metering valve by regulating the amount of fuel by-passed from conduit 68 through passage 72 to the inlet of pump 32.

Referring again to Fig. 1, sleeve 48 in metering valve 34 is moved axially under the influence of a centrifugal governor connected to and driven by the power plant and sensing power plant speed, the governor having flyweights 74 acting on cup 76 at the end of spindle 78 connected to sleeve 48 (Fig. 2). As power plant speed increases the action of the flyweights tends to move the sleeve downwardly to decrease the effective area of metering ports 44 and 50 and reduce fuel flow to the power plant. This action is opposed by speeder spring 80 positioned between cup 76 and a second cup 82, the position of which is variable as a function of a power lever setting. Power lever 84 is connected through bell crank 86, link 88 and arm 90 to shaft 92 and cam 94 on the shaft. The cam engages follower 96 on lever 98 which is pivoted on fixed pin 110. The lever is pivotally attached to cup 82 so that the position of the cup is a function of the position of the power lever, thus providing for the adjustment of the datum of the speed governor. It should be obvious that as the power lever is moved in the direction calling for a power increase, spring 80 is compressed and sleeve 48 can move upwardly to increase the quantity of fuel flowing to the power plant. This increase in fuel flow increases power plant speed and as the flyweights rotate faster equilibrium in the speed governor is achieved.

In addition to being shiftable longitudinally as a function of power plant speed, sleeve 48 is rotatable as a function of a compressor pressure. In the arrangement shown the rotational position of the sleeve is a function of compressor discharge pressure. Compressor discharge pressure is used to avoid secondary effects such as compressor air bleeds or compressor damage. To accomplish this sleeve 48 has integral therewith pinion 112 which meshes with rack 114, the position of which is a function of the compressor pressure. Rack 114 is connected to rod 116 connected in turn to the free end of bellows 118 located in chamber 120. The bellows is evacuated and chamber 120 is connected by line 122 to pressure station 124 at the discharge end of the compressor so that the exterior of the bellows is subject to compressor discharge pressure. Thus, the position of rack 114 is varied in response to variations in compressor discharge pressure and sleeve 48 is rotated accordingly. It is to be noted that compressor discharge pressure is essentially the same as the pressure within burner 26, and this pressure sometimes is referred to as burner case pressure.

Power lever 84 is connected to a propeller governor as well as being connected to the fuel control, bell crank 86 on the power lever being connected by link 126 to propeller governor 128. Power plant output thus is controlled by rotating a single lever to actuate both the fuel control and the propeller governor. Operation of the power plant, however, is divided into the ground handling or beta range and the flight operating range. In the beta range, which is roughly half the travel of power lever 84, the propeller is non-governing and propeller pitch is fixed or is controlled on a predetermined mechanical schedule as a function of power lever position. Speed control is obtained through the fuel control and the selected speed is determined by the surface profile on cam 94. In the flight operating range the propeller, by means of its own governing system, establishes whatever blade angle is necessary to maintain power plant speed selected according to the power lever schedule, and fuel flow is metered to a preselected value to establish power output for a particular power lever setting. A typical propeller governor of this type is described in co-pending application Serial No. 314,593, filed October 14, 1952, now Patent No. 2,840,169, by Thomas P. Farkas for Propeller Control System.

The coordinating linkage between the power lever and the fuel control and propeller governor is so arranged that movement of the power lever causes power plant operation to follow a coordinated schedule of speed and power. During steady state operation of the power plant, fuel metering to establish the selected power is determined by the total metering orifice area formed by the relative position of ports 44 and 50 and this is made to be a function of power lever position, compressor discharge pressure, compressor inlet temperature, and power plant speed. Provision much be made, however, to limit the maximum or minimum fuel flow to meet the operational requirements of the power plant. This provision can be made by providing stops for limiting translational movement of sleeve 48 and these stops will now be described.

Movement of power lever 84, in addition to resetting the fuel control and propeller governor, rotates pinion 130 on shaft 132 connected to the lever and about which it rotates. The pinion in turn rotates splined shaft 134 and three-dimensional cam 136, known as the setting cam, mounted thereon. The cam is internally splined so that it can be translated on the shaft. Translational movement is controlled by liquid filled bellows 138 in chamber 140. The chamber is connected by line 142 to temperature responsive probe 144 mounted on the power plant adjacent the inlet to compressor 26. One end of the bellows is fixedly attached to wall 146 in chamber 140 and the opposite end of the bellows is free to move. This free end of the bellows is connected by rod 148 to arm 150 of bell crank 152 and the other arm 154 of the bell crank is connected to cam 136. Thus, movement of power lever 84 rotates the cam and expansion and contraction of bellows 138 with variations in compressor inlet temperature translates the cam. The position of setting cam 136 is, therefore, a function of power lever position and compressor inlet temperature.

Follower 156 is in contact with the surface of cam 136. The follower is mounted on one end of lever 158 which is pivoted at 160. The opposite end of the lever is connected by yoke 162 to three-dimensional cam 164, known as the power load cam, which is internally splined so that it can slide on splined shaft 166. Movement of cam 136 results in rotation of lever 158 to translate cam 164 as a function of power lever position and compressor inlet temperature.

Shaft 166 on which cam 164 slides is rotated in accordance with power plant speed. Arm 168 on the shaft is connected to link 170 which in turn is connected to the speed sensing device of Fig. 3. This device will be explained in detail below. The position of power load cam 164 is a function of power lever position, compressor inlet temperature, and power plant speed, and it controls a stop which limits the minimum area of metering ports 44 and 50. This is accomplished through follower 172 which is in contact with the surface of cam 164 and which is supported by arm 174 on sleeve 176. The sleeve surrounds and is free to rotate about fixed shaft 178. A second arm 180 extends from the sleeve and terminates in stop 182, known as the power load stop, which limits the downward travel of sleeve 48 and the minimum opening of metering ports 44 and 50 as will be explained. Tension spring 184 between arm 180 and fixed surface 186 tends to rotate sleeve 176 about shaft 178 to hold follower 172 in contact with the surface of cam 164.

Sleeve 48 has stem 188 extending below pinion 112 and terminating in head 190 of somewhat larger diameter than the stem. Washer 192 surrounds stem 188 and is slidable thereon. It normally is held in contact with the shoulder (not visible) between stem 188 and head 190 by compression spring 194, the upper end of the spring being restrained in hole 196 in the stem. Thus, downward travel of sleeve 48 is limited by the position of stop 182 and will be terminated when the under surface of washer 192 contacts the stop. However, by virtue of spring 194, further downward travel of the sleeve for further limiting of metering valve area is possible if the force of spring 194 is overcome. This may be brought about by certain power plant operation, which operation now will be described.

When power lever 84 is rotated suddenly in a clockwise direction tending to decelerate the power plant, speeder spring 80 is unloaded. The removal of this force on flyweights 74 permits the flyweights to swing outward, forcing sleeve 48 downward to decrease the effective area of metering ports 44 and 50. In the flight operating range downward travel of the sleeve would be limited by power load stop 182, but the force of the unloaded flyweights will compress spring 194 to decrease metering valve area beyond that limited by the stop. Deceleration stop 198 will be contacted by head 190 as sleeve 48 moves downward, which stop will prevent further decreas of metering port area and prevent fuel flow from dropping below the lean fuel-air ratio limit of the combustion system.

The position of deceleration stop 198 is a function of power plant speed and is controlled by cam 210, known as the deceleration cam. This cam is mounted on shaft 166 and may be splined if sliding movement of the cam on the shaft is desired. Spring 212 is interposed between cam 210 and power load cam 164, the spring serving to maintain follower 156 in contact with the surface of setting cam 136. Since shaft 166 is rotated in accordance with power plant speed, deceleration cam 210 is rotated in accordance with power plant speed. Follower 214 is in contact with the surface of the cam and is mounted on one end of lever 216 which is pivotally mounted on shaft 178. The opposite end of the lever is contacted by adjustment screw 218 carried by arm 220. One end of the arm is pivoted, as at 222, about shaft 178 and the opposite end of the arm carries stop 198. Tension spring 224 between arm 220 and fixed surface 186 holds the adjustment screw against lever 216 and also holds follower 214 against the surface of cam 210.

While sudden rotation of the power lever in a clockwise direction may cause compression of spring 194, overspeeding of the power plant also may cause compression of the spring. If the power plant should tend to overspeed, the force of flyweights will be great enough to push sleeve 48 downward against power load stop 182, if it is not already there, and to compress spring 194. A topping fuel governor is provided to reduce fuel flow to zero as the overspeed condition increases, the governor overriding all other metering considerations. Normally, meterhead 190 would contact deceleration stop 198 as sleeve 48 is pushed downward by the flyweights. In the case of an overspeed condition, shaft 166 is rotated by a speed sensing device such as that of Fig. 3. Deceleration cam 210 also is rotated and the cam surface is so contoured that the overspeed condition retracts stop 198, permitting sleeve 48 to be driven downward by flyweights 74 to reduce fuel flow to zero. By means of this structure the normal flyweights for the fuel control are used to provide a topping fuel governor which prevents the power plant from overspeeding.

In order to avoid excessive turbine inlet temperature and also to avoid compressor stall, a stop is provided which limits the maximum area of metering ports 44 and 50. Extension 226 on arm 150 of bell crank 152 is connected to three-dimensional cam 228, known as the maximum fuel cam. The cam is mounted on shaft 166 and is internally splined so as to be capable of sliding along the shaft axis. Such sliding movement results when bellows 138 expands or contracts due to variations in compressor inlet temperature. Since the cam rotates with the shaft by virtue of the splines, the position of the cam is a function of compressor inlet temperature and power plant speed.

Follower 230 is in contact with the surface of cam 228 and is supported by arm 232 on sleeve 234. The sleeve surrounds and is free to rotate about fixed shaft 178. A second arm 236 extends from the sleeve and terminates in stop 238, known as the maximum fuel stop, which limits upward travel of sleeve 48 and the maximum opening of metering ports 44 and 50. As the sleeve tends to move upward, the top surface of washer 192 comes into contact with stop 238 and further upward travel of the sleeve is prohibited. Tension spring 240 holds follower 230 in contact with cam 228.

The structure is such that deceleration cam 210 is slid along shaft 166 when maximum fuel cam 228 is slid along the shaft by expansion or contraction of bellows 138. The surface profile of cam 210 may be such that sliding has no effect on deceleration stop 198, or the surface profile may be three-dimensional so that the stop is positioned as a function of compressor inlet temperature as well as a function of speed.

Operation of the power plant, as has been stated above, is divided into the ground handling and flight operating ranges. In order to provide stability in the ground handling range, the fuel control here incorporates a speed governor, i.e., flyweights 74, speeder spring 80, and cam 94, to effect ground handling.

For an example of ground handling operation, in going from ground idle to flight idle, power lever 84 would be advanced from a partially closed position to about its half-way position. Propeller pitch will remain fixed, or substantially fixed if controlled on a predetermined mechanical schedule. Cam 94 will be rotated in a counterclockwise direction which will increase the loading on spring 80. Since the force of flyweights 74 will not be changed appreciably, since power plant speed has been changed little if at all, the increased spring load will drive sleeve 48 upward. This increases fuel flow to the power plant which in turn increases power plant speed and flyweight force.

Maximum fuel stop 238, however, which is positioned as a function of power plant speed and inlet temperature, will limit the upward travel of the sleeve and prevent the increasing of fuel flow to the power plant beyond that which would exceed the maximum temperature and compressor stall limits for the power plant. Maximum fuel flow will be determined by this stop as long as the temperature and stall limits would be exceeded. As power plant speed increases flyweights 74 drive sleeve 48 downward, reducing metering valve area and fuel flow to the power plant. At flight idle speed, the flyweight force equals the spring force and equilibrium in the governor is restored. At this selected speed the metering valve will occupy a position between maximum fuel stop 238 and deceleration stop 198, power load stop 182 generally not being effective in the ground handling range.

In going from flight idle to ground idle, decreasing the load on spring 80, sleeve 48 will be urged by the force of flyweights 74 against deceleration stop 198, which is positioned as a function of power plant speed. The valve will move away from the stop as equilibrium is restored in the governor.

In the flight operating range between the flight idle position of power lever 84 and its maximum advanced position, cup 82 is maintained in substantially a fixed position by virtue of the profile of cam 94 and the propeller governing system controls power plant speed. Fuel is metered according to a predetermined power lever schedule, the position of power lever 84 controlling power load stop 182. Acceleration and deceleration limits are provided by stops 238 and 198, respectively, and the topping governor provides power plant overspeed protection.

In both flight operating and ground operating regimes, the fuel flow is determined by stops 182 or 198 whenever the actual power plant speed exceeds the speed corresponding to the setting of spring 80, and by stop 238 whenever the actual speed is less than the speed corresponding to the setting of spring 80. Thus, the speed governor in the fuel control drives the metering valve between its limiting stops.

Figure 3:
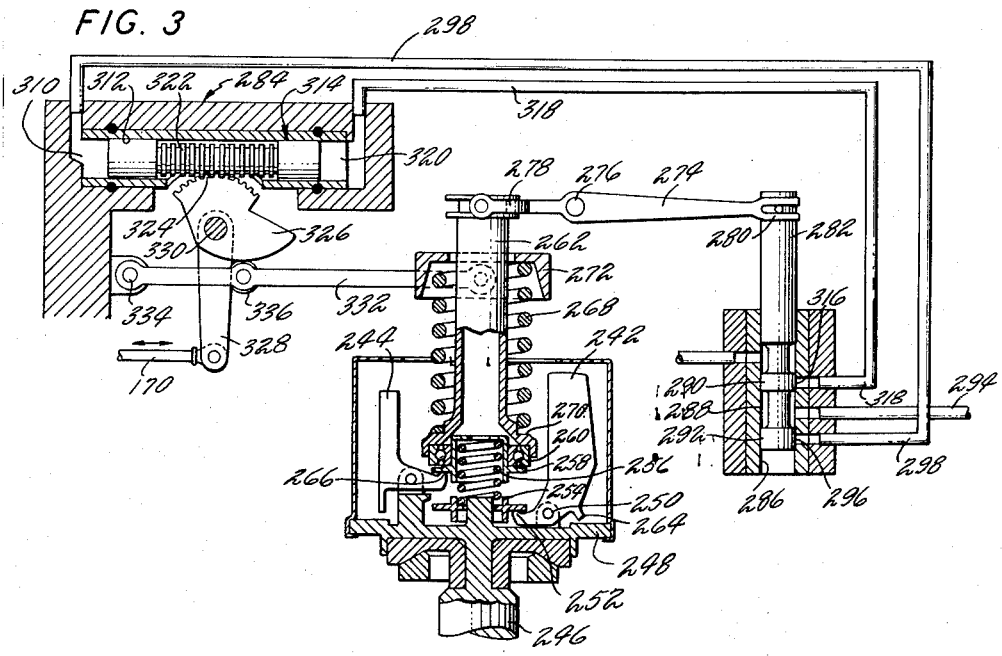
Fig. 3 is a schematic view of the speed sensing device.

The power plant speed sensing device which rotates shaft 166 and which is shown in Fig. 3 will now be described. As can be seen the device has two sets of flyweights, only one flyweight of each set being shown. Low speed flyweights 242 have a relatively large mass and are designed so as to sense power plant speed and give a strong signal which can be used to accurately control fuel metering in the very low power plant speed range. Main flyweights 244 have a much smaller mass than flyweights 242 and are designed to control fuel metering in the high speed range. The signal from the two sets of flyweights will be the resultant of the combined output values and provides a strong speed signal throughout the power plant speed range.

Shaft 246 in the speed sensing device is driven by the power plant, preferably by the same drive that drives flyweights 74. Plate 248 is integral with the shaft, rotating therewith, and low speed flyweights 242 and main flyweights 244 are mounted on the plate. In the low speed range, flyweights 242, by virtue of their relatively large mass, are the principal force transmitting a signal to rotate shaft 166 and the cams thereon. As power plant speed increases flyweights 242 swing outward about pivot 250 and toe 252 pushes low speed ring 254 upward. This compresses soft spring 256, interposed between low speed ring 254 and high speed ring 258, which in turn pushes bearing 260 and stem 262 upward. High speed ring 258, bearing 260 and stem 262 form a single unit with the bearing providing for relative rotational movement between the ring and the stem.

As flyweights 242 swing outward in response to a continued increase in power plant speed, heel 264 on the flyweights abuts plate 248 and further outward movement of the flyweights is prevented. By this time power plant speed has become sufficiently high so that flyweights 244 are effective and these flyweights are the force transmitting a signal to rotate shaft 166. Toe 266 on flyweights 244 pushes high speed ring 258 and stem 262 upward as the flyweights swing outward upon an incerase in speed. The force of flyweights 242 and 244 pushing upward on stem 262 is resisted by spring 268 interposed between shoulder 270 on the lower end of the stem and cup 272.

Movement of stem 262 in response to flyweight force rotate lever 274 about pivot 276. The lever is pivotably connected at one end by yoke 278 to stem 262 and at its other end by yoke 280 to pilot valve 282. Movement of the stem thus is transmitted to the pilot valve which controls the flow of motive fluid to servo motor 284. The pilot valve slides in bore 286 and has groove 288 thereon defined between lands 290 and 292. High pressure fluid, from a source such as unmetered fuel conduit 68, is admitted to the annulus formed by bore 286 and groove 288 by conduit 294.

When the pilot valve is moved downward under the influence of the flyweights, land 292 uncovers port 296 and high pressure fluid is admitted through passage 298 to chamber 310 in servo motor 284. The chamber is defined by bore 312 and the left end of piston 314 therein. When the pilot valve is moved upward, land 290 uncovers port 316 and high pressure fluid is admitted through passage 318 to chamber 320 at the right end of piston 314. This is a conventional servo system and when either chamber 310 or chamber 320 is connected to the pressure fluid the other chamber is connected to a drain or low pressure source to create a pressure differential across the piston. This pressure differential causes the piston to move along the axis of the bore toward the chamber vented to drain.

The midportion of piston 314 has rack 322 thereon which meshes with gear segment 324 on cam 326. Movement of the piston rotates the cam and arm 328 connected thereto about axis 330. The arm is connected to link 170 which is connected to shaft 166 on which cams 164, 210 and 228 are mounted. Movement of piston 314 in response to the speed signal transmitted by flyweights 242, 244 thus rotates the shaft and cams as function of power plant speed.

A follow-up arrangement is provided in arm 332 which has one end pivoted at 334 and the opposite end connected to spring cup 272. Cam 326 is in contact with roller 336 on the mid-portion of the arm and as the cam is rotated by piston 314 arm 332 is rotated by the cam to reset the load on spring 268. By virtue of this follow-up arrangement ring 258, and flyweights 244, are maintained in substantially a fixed position. Whenever the ring is displaced from this position the servo system and follow-up restore the ring to equilibrium by balancing the flyweight forces.

The action of the flyweights can be seen in the graph of Fig. 4. The spring cup force for the low speed flyweights is substantially large in the low r.p.m. range. By the time the low speed flyweights are against their stop, the spring cup force for the main flyweights has reached a sufficient value that these flyweights can take over and reliably sense speed in the higher speed ranges. The combination of the two flyweight sets augments speed sense forces at low speeds and provides a reliable and strong speed signal throughout the speed range of the power plant.

It is to be understood that the invention is not limited to the specific embodiment herein illustrated and described, but may be used in other ways without departure from its spirit as defined by the following claims.

I claim:

1. For a gas turbine power plant having a controllable pitch propeller, a fuel control including conduit means through which fuel is supplied to said power plant, metering means in said conduit means controlling fuel flow to said power plant, means for varying the area of said metering means as a function of at least one power plant operating variable, means including at least two sets of governor flyweights for sensing power plant speed, stop means actuated by said speed sensing means for limiting the minimum area of said metering means, and means actuated by said speed sensing means for retracting said stop means when the speed of said power plant tends to exceed a predetermined limit.

2. For a gas turbine power plant having a controllable pitch propeller, a fuel control including conduit means through which fuel is supplied to said power plant, metering means in said conduit means controlling fuel flow to said power plant, means for varying the area of said metering means as a function of at least one power plant operating variable, stop means for limiting the maximum area of said metering means as function of at least one power plant operating variable, stop means for limiting the minimum area of said metering means as a function of power plant speed, and means for rendering ineffective said minimum area limiting means when the speed of said power plant tends to exceed a predetermined limit.

3. For a gas turbine power plant having a controllable pitch propeller, a fuel control including conduit means through which fuel is supplied to said power plant, metering means in said conduit means controlling fuel flow to said power plant, means for varying the area of said metering means as a function of at least one power plant operating variable, stop means for limiting the maximum area of said metering means as a function of power plant speed, stop means for limiting the minimum area of said metering means as a function of power plant speed, means for rendering ineffective said minimum area limiting means as a function of a power plant speed when the speed of said power plant tends to exceed a predetermined limit, and power plant speed sensing means for said maximum limiting, said minimum limiting, and said ineffective rendering means including at least two sets of flyweights, one set of flyweights having a relatively larger mass than the other set of flyweights.

4. For a gas turbine power plant having a controllable pitch propeller, a fuel control including a power lever, conduit means through which fuel is supplied to said power plant, metering means in said conduit means controlling fuel flow to said power plant, means for varying the area of said metering means as a function of at least one power plant operating variable, stop means for limiting the area of said metering means as a function of the position of said power lever and power plant speed, stop means for limiting the maximum area of said metering means as a function of power plant speed, stop means for limiting the minimum area of said metering means as a function of power plant speed, means for rendering ineffective said minimum area limiting means as a function of a power plant speed if the speed of said power plant tends to exceed a predetermined limit, and power plant speed sensing means for said limiting and said ineffective rendering means including at least two sets of flyweights, one set of flyweights having a relatively larger mass than the other set of flyweights.

5. For a gas turbine power plant, a fuel control including conduit means through which fuel is supplied to said power plant, metering means in said conduit means controlling fuel flow to said power plant, means for varying the area of said metering means as a function of at least one power plant operating variable, means including at least two sets of governor flyweights of different mass rotating about a common shaft for sensing power plant speed, and means actuated by said speed sensing means for limiting the minimum area of said metering means.

6. For a gas turbine power plant, a fuel control including conduit means through which fuel is supplied to said power plant, metering means in said conduit means controlling fuel flow to said power plant, means for sensing the speed of said power plant, means for varying the area of said metering means as a function of said speed sensing means, stop means for limiting the minimum area of said metering means as a function of power plant speed, and means for rendering ineffective said limiting means when power plant speed exceeds a predetermined limit, said power plant speed responsive means decreasing the area of said metering means to zero as the power plant overspeeds.

7. For a gas turbine power plant fuel control, said fuel control including metering means for varying fuel flow to said power plant, speed responsive means for controlling the area of said metering means, and speed responsive means for limiting the area of said metering means, said latter speed responsive means including two sets of flyweights rotating about a common shaft, one of said flyweight sets being designed to control fuel flow in the low speed range of said power plant and the other of said flyweight sets being designed to control fuel flow in the high speed range of said power plant.

8. For a turboprop engine, a propeller governor, a fuel control and a power lever, means for the coordinate adjustment of said propeller governor and said fuel control by said power lever to control engine operation in the ground handling and flight operating ranges, said fuel control including conduit means through which fuel is supplied to said engine, metering means in said conduit means controlling fuel flow to said engine, governor means responsive to engine speed for varying the area of said metering means, means for adjusting the datum on said governor means by said power lever to control engine speed in the ground handling range, means for inactivating said datum adjusting means in the flight operating range, means for controlling engine speed independently of said governor in the flight operating range, and stop means for limiting the area varying of said governor means.

9. For a turboprop engine, a propeller governor, a fuel control and a power lever, means for the coordinate adjustment of said propeller governor and said fuel control by said power lever to control engine operation in the ground handling and flight operating ranges, said fuel control including conduit means through which fuel is supplied to said engine, metering means in said conduit means controlling fuel flow to said engine, a first governor sensing engine speed and connected to said metering means for varying the area thereof, means for loading said governor, means for varying the loading on said governor by said power lever to control engine speed in the ground handling range, means for inactivating said load varying means in the flight operating range, a second governor including at least two sets of flyweights of different mass rotating about a common shaft for sensing engine speed, and means for said second governor to limit the effect of said first governor on said metering means.

10. For a turboprop engine having a compressor, a propeller governor, a fuel control and a power lever, means for the coordinate adjustment of said propeller governor and said fuel control by said power lever to control engine operation in the ground handling and flight operating ranges, said fuel control including conduit means through which fuel is supplied to said engine, metering means in said conduit means controlling fuel flow to said engine, variable datum means responsive to engine speed for varying the area of said metering means, means for adjusting the datum of said variable datum means by said power lever to control engine speed in the ground handling range, means for controlling engine speed independently of said variable datum means in the flight operating range, means responsive to engine speed and an engine temperature for limiting the maximum area of said metering means, and means responsive to power lever position, an engine temperature and engine speed for limiting the minimum area of said metering means.

11. For a turboprop engine having a compressor, a propeller governor, a fuel control and a power lever, means for the coordinate adjustment of said propeller governor and said fuel control by said power lever to control engine operation in the ground handling and flight operating ranges, said fuel control including conduit means through which fuel is supplied to said engine, metering means in said conduit means controlling fuel flow to said engine, variable datum means responsive to engine speed for varying the area of said metering means, means for adjusting the datum of said variable datum means by said power lever to control engine speed in the ground handling range, means for controlling engine speed independently of said variable datum means in the flight operating range, means responsive to engine speed and an engine temperature for limiting the maximum area of said metering means, means responsive to power lever position, an engine temperature and engine speed for limiting the minimum area of said metering means, and means responsive to engine speed for limiting the minimum area of said metering means.

12. For a turboprop engine having a compressor, a propeller governor, a fuel control and a power lever, means for the coordinate adjustment of said propeller governor and said fuel control by said power lever to control engine operation in the ground handling and flight operating ranges, said fuel control including conduit means through which fuel is supplied to said engine, metering means in said conduit means controlling fuel flow to said engine, variable datum means responsive to engine speed for varying the area of said metering means, means for adjusting the datum of said variable datum means by said power lever to control engine speed in the ground handling range, means for controlling engine speed independently of said variable datum means in the flight operating range, means responsive to engine speed and an engine temperature for limiting the maximum area of said metering means, means responsive to power lever position, an engine temperature and engine speed for limiting the minimum area of said metering means, stop means responsive to engine speed for limiting the minimum area of said metering means, and means for retracting said stop means when said engine tends to overspeed.

13. For a turboprop engine having a compressor, a propeller governor, a fuel control and a power lever, means for the coordinate adjustment of said propeller governor and said fuel control by said power lever to control engine operation in the ground handling and flight operating ranges, said fuel control including conduit means through which fuel is supplied to said engine, metering means in said conduit means controlling fuel flow to said engine, variable datum means responsive to engine speed for varying the area of said metering means, means for adjusting the datum of said variable datum means by said power lever to control engine speed in the ground handling range, means for controlling engine speed independently of said variable datum means in the flight operating range, governor means including at least two sets of flyweights of different mass for sensing engine speed, means actuated by said governor means for limiting the maximum and minimum area of said metering means, and means actuated by said governor means for rendering ineffective said minimum area limiting means when said engine tends to overspeed.

(References on following page)

References Cited in the file of this patent

UNITED STATES PATENTS

| | | |
|---|---|---|
| 2,609,868 | Carey | Sept. 9, 1952 |
| 2,616,507 | Greenland | Nov. 4, 1952 |
| 2,645,293 | Ogle et al. | July 14, 1953 |
| 2,666,489 | Blanchard | Jan. 19, 1954 |
| 2,668,416 | Lee | Feb. 9, 1954 |
| 2,694,900 | Brandau | Nov. 23, 1954 |
| 2,708,826 | Torell | May 24, 1955 |
| 2,720,751 | Kunz | Oct. 18, 1955 |
| 2,727,503 | Reiners | Dec. 20, 1955 |
| 2,759,549 | Best | Aug. 21, 1956 |